United States Patent [19]

Nakamura et al.

[11] Patent Number: 4,950,438
[45] Date of Patent: Aug. 21, 1990

[54] MOLDING PROCESS FOR COATING A MOTOR STATOR

[75] Inventors: Kosei Nakamura, Hino; Yoshiyuki Hayashi, Yamanashi, both of Japan

[73] Assignee: Fanuc Ltd., Yamanashi, Japan

[21] Appl. No.: 347,961

[22] PCT Filed: Jun. 22, 1988

[86] PCT No.: PCT/JP88/00619
§ 371 Date: Feb. 8, 1989
§ 102(e) Date: Feb. 8, 1989

[87] PCT Pub. No.: WO88/10530
PCT Pub. Date: Dec. 29, 1988

[30] Foreign Application Priority Data

Jun. 22, 1987 [JP] Japan ................. 62-153396

[51] Int. Cl.$^5$ .............................................. B29C 39/10
[52] U.S. Cl. ................................ 264/272.2; 264/338; 425/812
[58] Field of Search ................ 264/272.2, 338, 313; 425/812

[56] References Cited

U.S. PATENT DOCUMENTS

| 3,058,156 | 10/1962 | O'Connor | 264/272.2 |
| 3,075,250 | 1/1963 | Strohn et al. | 264/272.2 |
| 4,714,576 | 12/1987 | Cotton et al. | 264/272.2 |

FOREIGN PATENT DOCUMENTS

| 120803 | 9/1979 | Japan . | |
| 38099 | 8/1982 | Japan . | |
| 75445 | 5/1983 | Japan | 264/272.2 |
| 823781 | 11/1959 | United Kingdom | 264/272.2 |

Primary Examiner—James Lowe
Attorney, Agent, or Firm—Armstrong, Nikaido, Marmelstein, Kubovcik & Murray

[57] ABSTRACT

A molding process for coating a motor stator (1) having coils (2) projecting outside from the opposite ends of the motor stator (1) with a synthetic resin. The stator having coils (2) projecting from the opposite ends thereof is placed in an upright position in combination with a built-up mold core. The synthetic resin is poured from the upper end of the mold core and the initially poured resin flowing around the outside of the coil projecting downward is discharged together with gas. The stator is thus coated entirely with the resin containing only a few pores through a single molding cycle. The stator can be readily separated from the mold core.

3 Claims, 2 Drawing Sheets

MOLDING PROCESS FOR COATING A MOTOR STATOR

DESCRIPTION

1. Technical Field

The present invention relates to a molding process for coating the stator windings of a motor by molding, which process is widely employed in the motor manufacturing field.

2. Background Art

Conventionally, portions of stator coils projecting from a motor stator are coated with a resin, and in such a conventional resin-coating process, stator coils in one side of a stator core are first resin-coated by placing one side of the stator core in a mold for resin-coating, and stator coils in the other side of the stator core are then resin-coated in the same manner. In another conventional resin-coating process, a stator inclined in one direction at an inclination (approximately 15−) is rotated while a resin is dripped on the upper portions of stator coils, to impregnate the upper portions of the stator coils with the resin, the stator is inverted, and the resin is then dripped similarly on the upper portions of the stator coils to impregnate the upper portions of the stator coils with the resin, while the stator is rotated.

For a motor which must be cooled internally, such as a spindle motor, coating the coils with a synthetic resin is advantageous, particularly with respect to coil protection. Nevertheless, the foregoing conventional resin-coating processes for coating stator coils with a synthetic resin can coat the stator coils only on one side of the stator core in one resin-coating cycle, and thus the resin-coating cycle must be repeated twice to coat all of the stator coils with the synthetic resin, which is inefficient.

A spindle motor particularly requiring a liquid-resistant (water-resistant) coating for the coils has a comparatively long stator core, and therefore, the simultaneously coating of the coils on opposite sides of the stator core which need not necessarily be coated causes problems such as an unsatisfactory impregnation of the coils with the synthetic resin, an incomplete venting, and difficulty in removing the stator core from the mold due to a contraction of the synthetic resin during cooling.

The present invention provides a means capable of solving the foregoing problems and capable of fundamentally eliminating the defects of the conventional means.

DISCLOSURE OF THE INVENTION

According to the present invention, an integral stator, comprising a stator core 1 and coils 2 partly projecting from the stator core 1, is placed in an upright position, a mold core consisting of a top mold 3, a middle mold 4, a first bottom mold 5, and a second bottom mold 6 is combined with the stator as shown by way of example in FIG. 1, and then a heated synthetic resin solution is poured through sprues 0 formed in the top mold 3 into a cavity formed between the built-up mold and the stator. After the resin has filled the bottom portion of the cavity around the lower ends of the coils and has started flowing through drain holes 9 formed in a lower ring 8, the drain holes are stopped with plugs 81. Consequently, the resin fills the remaining portions of the cavity including an annular runner W tapered upward. After the cavity has completely been filled with the resin, the resin is left to cool and solidify. Gas remaining around the lower ends of the coils in the bottom portion of the cavity flows along the outer side of the lower ends of the coils and is discharged through the drain holes 9 together with the resin solution. The gas contained in the resin solution filling a portion of the cavity inside the stator and the gas contained in the resin solution filling a portion of the cavity around the upper ends of the coils flow upward and escape from the sprues 0 formed in the top mold of the mold. The surface of the mold is coated with an elastic coating film 7 to absorb strain induced by the solidification of the synthetic resin solution, and thus prevents any difficulty in separating the mold from the stator.

Furthermore, since the annular runner W is tapered upward, the flow speed of the resin within the annular runner W diminishes as the resin flows downward within the annular runner W, the molten synthetic resin is filled satisfactorily in the cavity, and the gas is efficiently vented.

The present invention provides the following unique effects.

Stator windings can be coated with a resin through a single molding process by using a built-up mold.

The molding liquid resin introduced into a portion of a cavity formed between the inner surface of a stator and a mold where gas bubbles are liable to form is discharged while the molten resin is poured into the cavity, and thus the molding process is achieved efficiently and only a few pores are formed in the molded resin.

The adhesion of the molding resin to the surface of the mold due to contraction can be reduced by the elastic coating film coating the surface of the mold, which facilitates the separation of the mold from the stator.

Since the built-up mold is assembled by fastening the component molds together with bolts, the built-up mold can be readily disassembled by a screw action when separating the mold from the stator by unfastening the bolts.

BEST MODE OF CARRYING OUT THE INVENTION

Figure 1:
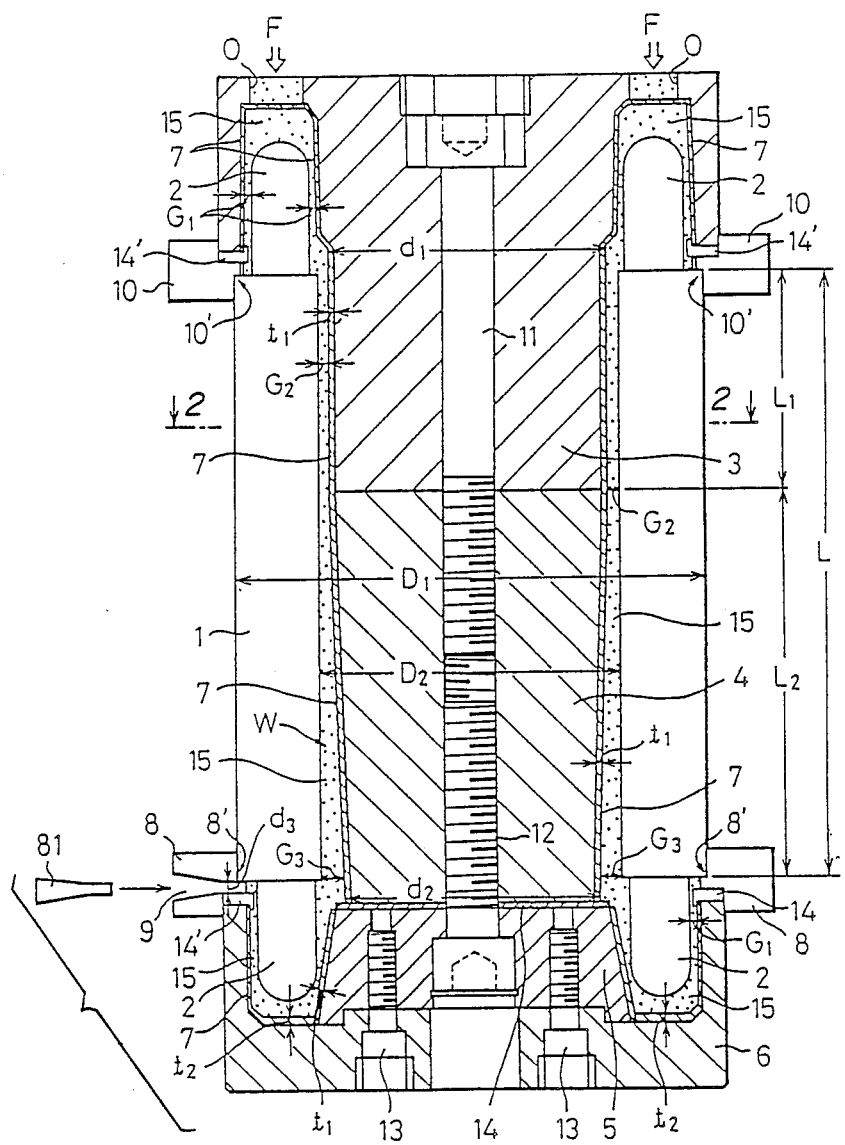
FIG. 1 is a side elevation view for explaining a molding process for coating a motor stator, embodying the present invention, in which a synthetic resin is poured into a cavity.

The present invention will be described as applied to coating the stator of a large spindle motor by molding. FIG. 1 shows a stator combined with a mold and coated with a synthetic resin poured into a cavity formed between the mold and the stator, and FIG. 2 is a sectional view taken along the line A—A in FIG. 1, showing a resin-coated stator.

Figure 2:
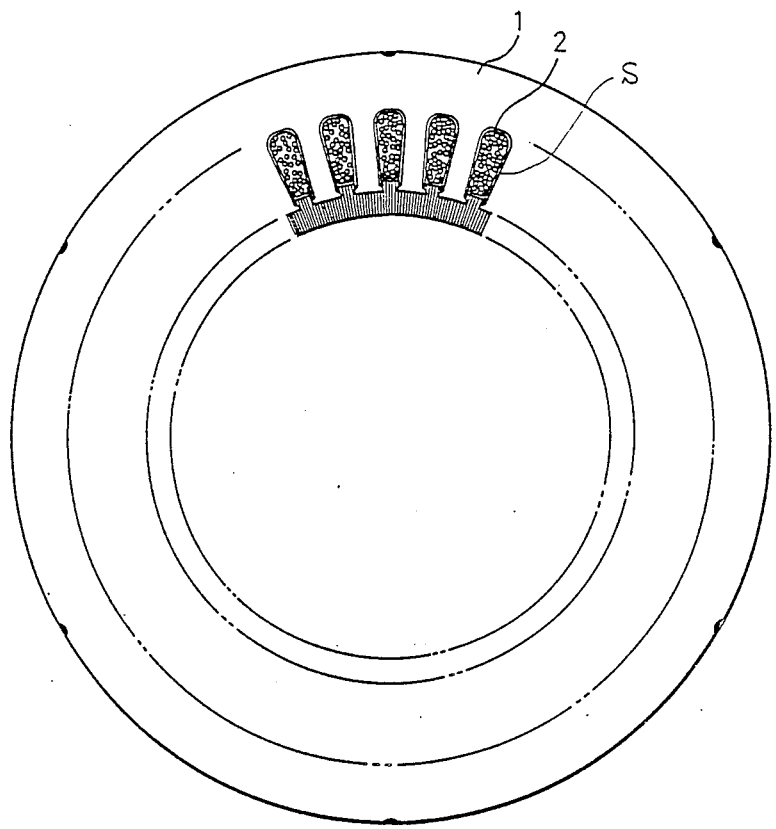
FIG. 2 is a cross section taken along the line A—A in FIG. 2, in which a mold is removed.

As shown in FIGS. 1 and 2, a stator comprises a stator core 1 provided with a plurality of slots S formed in the inner circumference thereof, and coils 2 fitted respectively in the slots S. The coils 2 project partly from the opposite ends of the stator core 1.

Mold Setting:

A mold consists of a top mold 3, a middle mold 4, a first bottom mold 5, a second bottom mold 6, a lower ring 8 and an upper ring 10, which are formed of an aluminum alloy. When assembling the component molds 3, 4, 5, and 6, a bolt 11 inserted through the top mold 3 is screwed in the middle mold 4 to fasten the top mold 3 to the middle mold 4, the first bottom mold 5 is joined through a silicon rubber packing 14 to the middle mold 4, a bolt 12 is inserted through the first bottom mold 5 and screwed into the middle mold 4 to fasten the first bottom mold 5 to the middle mold 4, and then the second bottom mold 6 is fastened to the first bottom mold 5 with bolts 13. The upper ring 10 is fitted precisely on the upper end of the stator core 1 so that the inner shoulder 10, thereof is seated on the upper end of the stator core 1. The lower ring 8 is fitted precisely on the lower end of the stator core 1 so that the inner shoulder 8, thereof is seated on the lower end of the stator core 1. The lower end of the top mold 3 is received in the upper ring 10 and seated through a silicon rubber packing 14, on the inner shoulder 10' of the upper ring 10. The upper end of the second bottom mold 6 is received in the lower ring 8 and seated through a silicon rubber packing 14' on the inner shoulder 8' of the lower ring 8. The molding surfaces of the component molds 3, 4, 5 and 6 are coated respectively with a silicon rubber film 7 having a thickness $t_1$ of from 1 to 1.5 mm. The thickness of the silicon rubber film 7 coating the upper surface of the second bottom mold 6 forming the bottom surface of a cavity formed between the mold and the stator core 1 is 2 mm. An ordinary mold lubricant, such as a silicon resin or a fluorocarbon resin, is sprayed over the surfaces of the silicon rubber films 7 when assembling the mold core.

The dimensions of the assembly of the mold and the stator are as follows. The stator core 1 has a length L =226 mm, an outside diameter $D_1$=180 mm and an inside diameter $D_2$=115 mm, the length of projection of the coils 2 is approximately 50 mm, the overall length of the stator is approximately 325 mm, the thickness $G_1$ of portions of the cavity around the projecting portions of the coils 2 is 3 mm, the thickness $G_2$ of a gap between the top mold 3 and the inner circumference of the stator core 1 at a distance $L_1$, which is approximately ⅓ the overall length of the stator core 1, from the upper end of the stator core 1 is 4 mm, the thickness $G_3$ of a gap between the middle mold 4 and the inner circumference of the stator core 1 at the lower end of the middle mold 4 is 8 mm, the outside diameter $d_1$ of the top mold 3 is 107 mm, and the outside diameter $d_2$ of the middle mold 4 at the lower end thereof is 100 mm. Accordingly, the runner formed between the inner circumference of the stator core 1 and the middle mold 4 is tapered upward.

Three drain holes 9, 4 mm in diameter, are formed in the lower ring 8 at equal angular intervals. The drain holes 9 can be stopped respectively with plugs 81.

Molding Process:

A molding epoxy resin solution is poured through sprues 0 formed in the top mold 3 into the cavity as indicated by arrows F with the drain holes 9 left open. After a portion of the cavity surrounding the lower ends of the coils 2 has been filled with the liquid synthetic resin and some portion of the initially poured liquid synthetic resin has flowed through the drain holes 9 of the lower ring 8 discharging gas, the drain holes 9 are stopped with the plugs 81, and then the liquid molding synthetic resin is poured further until the liquid molding resin overflows from the sprues 0.

The gas (bubbles) staying in the cavity flows gradually upward and escapes outside through the wide sprues 0 during and after the pouring of the liquid molding resin.

After the liquid synthetic resin has completely cooled off and solidified, the bolts 13 are removed to separate the second bottom mold 6 from the first bottom mold 5 by the agency of a screw torque, the bolt 12 is unfastened to separate the first bottom mold 5 from the middle mold 4 by the agency of a screw torque, the bolt 11 is unfastened to separate the top mold 3 from the middle mold 4, the middle mold 4 is extracted upward from the interior of the stator core 1, and then the rings 8 and 10 are removed from the stator core 1.

After thus separating the stator from the mold, portions of the synthetic resin coating the stator were machined to predetermined dimensions to finish the resin-coated stator. The inner circumference of the stator core 1 thus obtained was coated with a synthetic resin film 0.8 mm in thickness and the portions of the coils 2 projecting from the opposite ends of the stator core 1 were evenly coated with synthetic resin films having a desired thickness.

The present invention has been described as applied to resin-coating a comparatively long stator for a spindle motor, nevertheless, the liquid synthetic resin flows smoothly down the runner W by gravity to fill the cavity satisfactory, because the annular runner W is tapered upward. Furthermore, the upward tapered runner W allows an efficient venting (removal of bubbles).

Gas is most liable to remain in a portion of the cavity around the upper end of the outer side of the lower portions of the coils, but since the initially poured liquid resin containing gas, namely, the liquid resin containing gas rising in the cavity along the outer side of the coils, is discharged through the drain holes 9 provided in the portion where the gas is most liable to remain, namely, a blind portion of the cavity, the gas remaining in this portion is satisfactorily discharged, and the gas remaining in the rest of the portions of the cavity flows upward entirely and escapes through the sprues 0, whereby the gas is completely vented.

Furthermore, since the surface of each component mold was coated with an elastic film formed of silicon rubber, the contraction of the molding resin resulting from cooling and solidification was absorbed, which in cooperation with the effect of the mold lubricant sprayed over the surface of the film, facilitated the separation of the mold from the stator. The adhesion of the molding resin to the mold is greater in the lower portion of the mold than in the upper portion thereof, but since the first bottom mold 5 and the second bottom mold 6 are separable from each other and the thickness $t_2$ of the elastic film coating the bottom surface is greater than the thickness $t_1$ of the rest of the portions of the elastic film, the first bottom mold 5 can be separated from the second bottom mold 6 by a comparatively small force and the gravitational strain and the contractive strain properly absorbed by the thick elastic film.

In a spindle motor incorporating the stator thus manufactured, so-called minute vibrations generally generated in the stator core were suppressed by the coating resin. Noise also was suppressed.

Furthermore, when liquid-cooled, the coils were properly protected.

While the invention has been particularly shown and described in reference to preferred embodiments thereof, it will be understood by those skilled in the art that changes in form and details may be made therein without departing from the spirit and scope of the invention.

We claim:

1. A molding process for coating a cylindrical motor stator entirely through a single cycle, the cylindrical motor stator comprising a cylindrical stator core having two opposite ends at axial ends thereof and coils partly projecting from both of the opposite ends, the method comprising steps of:

placing the stator within a mold with the longitudinal axis of the cylindrical stator core extending vertically, the mold covering a whole surface of each of the coils and an inside surface of the cylindrical stator core; providing the mold with at least one inlet opening in proximity with a top end of the upwardly extending part of one mold and at least one drain hole at the junction between the core and the downwardly extending part of the one coil; and pouring a molten synthetic resin into a cavity defined by the stator core and the mold in a manner such that only the initially poured resin is discharged outside through the drain hole together with gas within the cavity such that no gas remains therein.

2. A molding process according to claim 1, wherein said step of pouring said resin includes the step of discharging said resin through drain holes formed in a ring fitted on the stator core around the downward projecting portions of the coils, and then stopping the drain holes with plugs.

3. A molding processing according to claim 1, wherein said step of placing said stator within said mold includes the step of placing said stator in a built-up mold formed by fastening together a plurality of upper and lower molds with bolts, wherein the contact surface of the mold which comes into contact with the synthetic resin is coated with an elastic film, wherein a runner defined by the surfaces of the mold and the stator core is tapered upward.

* * * * *